(12) United States Patent
Kim (10) Patent No.: US 11,079,465 B2
(45) Date of Patent: Aug. 3, 2021

(54) METHOD AND APPARATUS FOR ESTIMATING LOCATION OF SIGNAL SOURCE

(71) Applicant: Electronics and Telecommunications Research Institute, Daejeon (KR)

(72) Inventor: Jung-Bin Kim, Seoul (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 16/541,667

(22) Filed: Aug. 15, 2019

(65) Prior Publication Data

US 2020/0132800 A1    Apr. 30, 2020

(30) Foreign Application Priority Data

Oct. 30, 2018  (KR) .................. 10-2018-0131277
Mar. 20, 2019  (KR) .................. 10-2019-0031902

(51) Int. Cl.
| | | |
|---|---|---|
| *G01S 5/04* | (2006.01) | |
| *G01S 3/46* | (2006.01) | |
| *H04B 7/0456* | (2017.01) | |
| *H04W 64/00* | (2009.01) | |

(52) U.S. Cl.
CPC ............... *G01S 5/04* (2013.01); *G01S 3/46* (2013.01); *H04B 7/0482* (2013.01); *H04W 64/003* (2013.01)

(58) Field of Classification Search
CPC ........... G01S 3/46; G01S 5/04; H04B 7/0482; H04W 64/003
See application file for complete search history.

(56) References Cited

U.S. PATENT DOCUMENTS

| | | | |
|---|---|---|---|
| 7,352,721 B2* | 4/2008 | Kim .................... | H01Q 1/1257 370/334 |
| 9,549,253 B2* | 1/2017 | Alexandridis ......... | H04R 3/005 |
| 9,967,081 B2* | 5/2018 | Yang .................... | H04B 7/0413 |
| 10,285,015 B2* | 5/2019 | Shirakata ................. | G01S 5/10 |
| 10,348,423 B1* | 7/2019 | Zarubica .................... | G01S 3/64 |
| 2011/0050500 A1* | 3/2011 | Shirakawa ................ | G01S 3/74 342/378 |
| 2016/0218428 A1 | 7/2016 | Jung et al. | |
| 2017/0141482 A1 | 5/2017 | Park et al. | |

(Continued)

FOREIGN PATENT DOCUMENTS

| | | |
|---|---|---|
| KR | 10-1274554 | 6/2013 |
| KR | 10-1953697 | 3/2019 |

OTHER PUBLICATIONS

Bruno Demissie et al., "Localization of Multiple Sources with a Moving Array using Subspace Data Fusion", 2008 11th ICIF, Dept. Sensor Data and Information Fusion, pp. 1-7.

*Primary Examiner* — Liton Miah
(74) *Attorney, Agent, or Firm* — Kile Park Reed & Houtteman PLLC (57) ABSTRACT

Disclosed is a method and apparatus for estimating a signal source, the method including receiving, in at least one receiving node, a signal emitted from a signal source, extracting a steering matrix corresponding to a virtual antenna array by vectorizing the signal received in the at least one receiving node, and estimating a location of the signal source based on the steering matrix.

20 Claims, 5 Drawing Sheets

(56) References Cited

U.S. PATENT DOCUMENTS

| | | | |
|---|---|---|---|
| 2017/0141829 A1* | 5/2017 | Qiao | H04B 7/0617 |
| 2018/0115875 A1* | 4/2018 | Alsehly | H04W 4/024 |
| 2018/0242273 A1* | 8/2018 | Takahashi | H04B 7/0695 |
| 2019/0004138 A1* | 1/2019 | Hafenecker | G01S 1/20 |
| 2019/0044392 A1* | 2/2019 | Chowdhury | H02J 50/12 |
| 2020/0011956 A1* | 1/2020 | Zarubica | G01S 3/023 |

* cited by examiner

METHOD AND APPARATUS FOR ESTIMATING LOCATION OF SIGNAL SOURCE

CROSS-REFERENCE TO RELATED APPLICATION(S)

This application claims the priority benefit of Korean Patent Application No. 10-2018-0131277 filed on Oct. 30, 2018 in the Korean Intellectual Property Office and Korean Patent Application No. 10-2019-0031902 filed on Mar. 20, 2019 in the Korean Intellectual Property Office, the disclosures of which are incorporated herein by reference for all purposes.

BACKGROUND

1. Field

One or more example embodiments relate to a method and apparatus for estimating a location of a signal source.

2. Description of Related Art

In the case where positions of signal sources are close to each other, that is, when arrival angles of two signal sources at a reception point are similar, typical signal source position estimation techniques may have a limitation of a resolution such that the arrival angle and the position of the signal source are not accurately estimated.

The resolution may be improved by increasing a transmission power of the signal source, increasing a number of antennas and an aperture size of an antenna array, or increasing a number of received samples. However, when the number of antennas and the aperture size of the antenna array increases, the cost of a system for estimating an arrival angle and a signal source may also be increased.

In the method of increasing the transmission power of the signal source, a strong interference signal to other systems may be generated. Also, there may be an application field in which the transmission power of the signal source is uncontrollable, such as jammer position estimation and enemy signal source estimation.

In the method of increasing the number of received samples, an estimation error may occur when the signal source or a receiving node moves. Also, when the number of samples is large, a computational complexity may increase.

SUMMARY

An aspect provides technology for estimating a location of a signal source.

According to an aspect, there is provided a method of estimating a location of a signal source, the method including receiving, in at least one receiving node, a signal emitted from a signal source, extracting a steering matrix corresponding to a virtual antenna array by vectorizing the signal received in the at least one receiving node, and estimating a location of the signal source based on the steering matrix.

The extracting may include calculating a coefficient included in the steering matrix based on information on a reception location in which the signal is received by the at least one receiving node and an electromagnetic-wave propagation model, and extracting the steering matrix based on the coefficient.

The calculating may include calculating a distance between the reception location and each of candidate locations of the signal source, calculating a phase of the coefficient, and calculating a magnitude of the coefficient using the distance and the electromagnetic-wave propagation model.

The calculating of the phase may include calculating the phase based on a carrier frequency of the signal source, a propagation time of the signal, and a propagation speed of the signal.

The calculating of the magnitude may include calculating a magnitude of the coefficient using a pathloss model based on the distance.

The extracting may include calculating a coefficient included in the steering matrix based on a reference signal received from the signal source and extracting the steering matrix based on the coefficient.

The calculating of the coefficient may include calculating the coefficient by periodically or aperiodically receiving a constant signal corresponding to the reception location based on an orthogonal or non-orthogonal method.

The extracting may include vectorizing the signal by time shift of the signal when a difference between distances from the signal source to the at least one receiving node is greater than or equal to a predetermined value.

The estimating may include calculating a covariance matrix from a time sample of the vectorized signal, extracting an eigenvalue and an eigenvector from the covariance matrix, and estimating a location of the signal source based on the eigenvector and the steering matrix.

The estimating of the location of the signal source based on the eigenvector may include estimating, as a location of the signal source, a point corresponding to a peak value of a spatial power spectrum based on the steering matrix and the eigenvector.

According to another aspect, there is also provided an apparatus for estimating a location of a signal source, the apparatus including a receiver configured to receive, in at least one receiving node, a signal emitted from a signal source, and a processor configured to extract a steering matrix corresponding to a virtual antenna array by vectorizing the signal received in the at least one receiving node and estimate a location of the signal source based on the steering matrix.

The processor may be configured to calculate a coefficient included in the steering matrix based on information on a reception location in which the signal is received by the at least one receiving node and an electromagnetic-wave propagation model, and extract the steering matrix based on the coefficient.

The processor may be configured to calculate a distance between the reception location and each of candidate locations of the signal source, calculate a phase of the coefficient, and calculate a magnitude of the coefficient using the distance and the electromagnetic-wave propagation model.

The processor may be configured to calculate the phase based on a carrier frequency of the signal source, a propagation time of the signal, and a propagation speed of the signal.

The processor may be configured to calculate a magnitude of the coefficient using a pathloss model based on the distance.

The processor may be configured to calculate a coefficient included in the steering matrix based on a reference signal received from the signal source and extract the steering matrix based on the coefficient.

The processor may be configured to calculate the coefficient by periodically or aperiodically receiving a constant signal corresponding to the reception location based on an orthogonal or non-orthogonal method.

The processor may be configured to vectorize the signal by time shift of the signal when a difference between distances from the signal source to the at least one receiving node is greater than or equal to a predetermined value.

The processor may be configured to calculate a covariance matrix from a time sample of the vectorized signal, extract an eigenvalue and an eigenvector from the covariance matrix, and estimate a location of the signal source based on the eigenvector and the steering matrix.

The processor may be configured to estimate, as a location of the signal source, a point corresponding to a peak value of a spatial power spectrum based on the steering matrix and the eigenvector.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings. It should be understood, however, that there is no intent to limit this disclosure to the particular example embodiments disclosed. On the contrary, example embodiments are to cover all modifications, equivalents, and alternatives falling within the scope of the example embodiments.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Figure 1:
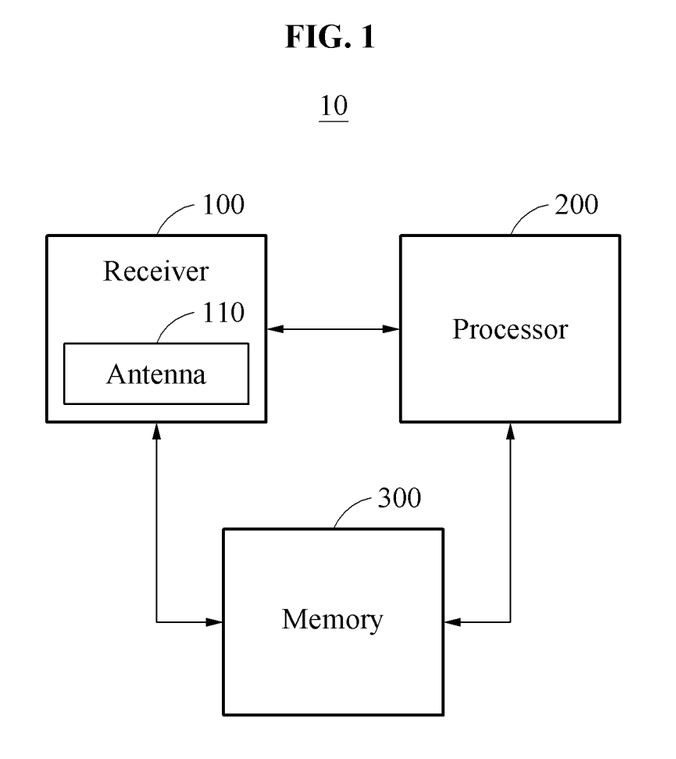
FIG. 1 is a block diagram illustrating a signal-source location estimating apparatus according to an example embodiment.

FIG. 1 is a block diagram illustrating a signal-source location estimating apparatus according to an example embodiment.

Referring to FIG. 1, a signal-source location estimating apparatus 10 may estimate a location of a signal source. The signal source may include at least one signal source. The signal source may emit a signal.

The signal-source location estimating apparatus 10 may receive the signal emitted from a signal source in at least one receiving node and estimate a location of the signal source by analyze the received signal.

The signal-source location estimating apparatus 10 may estimate an angle of arrival of the signal source and estimate a location of the signal source based on the estimated angle of arrival. The signal-source location estimating apparatus 10 may also estimate a location of the signal source without estimating the angle of arrival.

The signal-source location estimating apparatus 10 may be implemented as a printed circuit board (PCB) such as a motherboard, an integrated circuit (IC), or a system on chip (SoC). For example, the signal-source location estimating apparatus 10 may be implemented as an application processor.

The signal-source location estimating apparatus 10 may be implemented in a personal computer (PC), a data server, or a portable electronic device.

The portable electronic device may be implemented as, for example, a laptop computer, a mobile phone, a smartphone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, an e-book, and a smart device. The smart device may be implemented as a smart watch, a smart band, or a smart ring.

The signal-source location estimating apparatus 10 includes a receiver 100 and a processor 200. The signal-source location estimating apparatus 10 may further include a memory 300.

The receiver 100 may receive the signal emitted from the signal source in at least one receiving node. An antenna 110 may be located at a location of the receiving node.

The receiver 100 may include one antenna 110 or a plurality of antennas 110. For example, the antenna 110 may be implemented as an antenna array.

The signal received by the receiver 100 may be one signal or a plurality of signals. The receiver 100 may include a plurality of receiving points or receiving nodes at different locations.

The signal-source location estimating apparatus 10 may estimate a location of the signal source by converting the location estimated from the signal source into a form of a vector. The signal-source location estimating apparatus 10 may generate a virtual antenna array from a vectorized signal and estimate a location of the signal source using a steering matrix corresponding to a virtual antenna array system.

The signal-source location estimating apparatus 10 estimates a location and an angle of arrival of the signal source using at least one receiver 100. The at least one receiver 100 may be implemented as an antenna array.

The signal-source location estimating apparatus 10 may estimate an angle of arrival of the signal source at a receiving point using a difference in phase (or phase and intensity) of receiving signals of the receivers 100 included in an array of receivers 100. The signal-source location estimating apparatus 10 may estimate the angle of arrival of the signal source at a plurality of points, and then estimate a location of the signal source using the estimated angle of arrival and location information of the plurality of points.

The processor 200 may extract a steering matrix corresponding to the virtual antenna array by vectorizing the signal received in the at least one receiving nodes. The processor 200 may extract the steering matrix using various method.

As an example, the processor 200 may calculate a coefficient included in the steering matrix based on information on a reception location in which at least one signal is received and an electromagnetic-wave propagation model and extract the steering matrix based on the calculated coefficient.

Specifically, the processor 200 may calculate distances between the reception location and candidate locations of the signal source. The processor 200 may calculate a magnitude of the coefficient using the calculated distances and the electromagnetic-wave propagation model. For example, the processor 200 may calculate a magnitude of the coefficient using a pathloss model based on the distances.

Also, the processor 200 may calculate a phase of the coefficient. The processor 200 may calculate the phase based on a carrier frequency of the signal source, a propagation time of the signal, and a propagation speed of the signal.

As another example, the processor 200 may calculate a coefficient included in a steering matrix based on a reference signal received from the signal source and extract the steering matrix based on the coefficient.

Specifically, the processor 200 may calculate the coefficient by periodically or aperiodically receiving a constant signal corresponding to the reception location using an orthogonal or non-orthogonal method.

In this instance, when a difference between distances from the receiving node to the candidate locations of the signal source is greater than or equal to a predetermined value, vectorization may be performed by time shift of the signal.

The processor 200 may estimate a location of the signal source based on the extracted steering matrix. The processor 200 may calculate a covariance matrix from a time sample of the vectorized signal.

The processor 200 may extract an eigenvalue and an eigenvector from the covariance matrix. The processor 200 may estimate a location of the signal source based on the eigenvector and the steering matrix.

Specifically, the processor 200 may estimate a point corresponding to a peak value of a spatial power spectrum based on the steering matrix and the eigenvector, as a location of the signal source.

The memory 300 may store, for example, a component of a vector used for estimating a location of the signal source, the coefficient of the steering matrix, and information included in the received signal. The memory 300 may also store information on the estimated location of the receiving node.

The memory 300 may be implemented as a volatile memory device or a non-volatile memory device.

The volatile memory device may be implemented as, for example, dynamic random access memory (DRAM), static random access memory (SRAM), thyristor RAM (T-RAM), zero capacitor RAM (Z-RAM), or twin transistor RAM (TTRAM).

The non-volatile memory device may be implemented as, for example, electrically erasable programmable read-only memory (EEPROM), flash memory, magnetic RAM (MRAM), spin-transfer torque (STT)-MRAM, conductive bridging RAM (CBRAM), ferroelectric RAM (FeRAM), phase change RAM (PRAM), resistive RAM (RRAM), nanotube RRAM, polymer RAM (PoRAM), nano floating gate memory (NFGM), holographic memory, molecular electronic memory device, or insulator resistance change memory.

Figure 2:
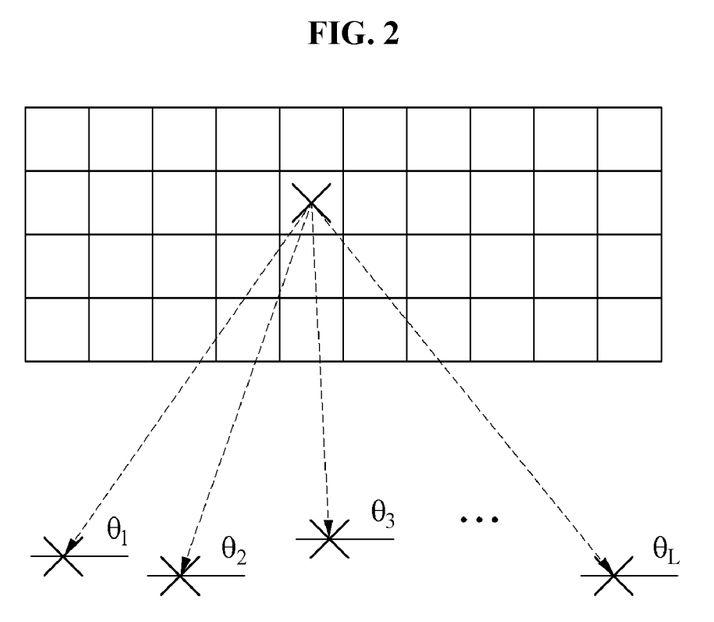
FIG. 2 is a diagram illustrating angles of arrival based on reception points.
Figure 3:
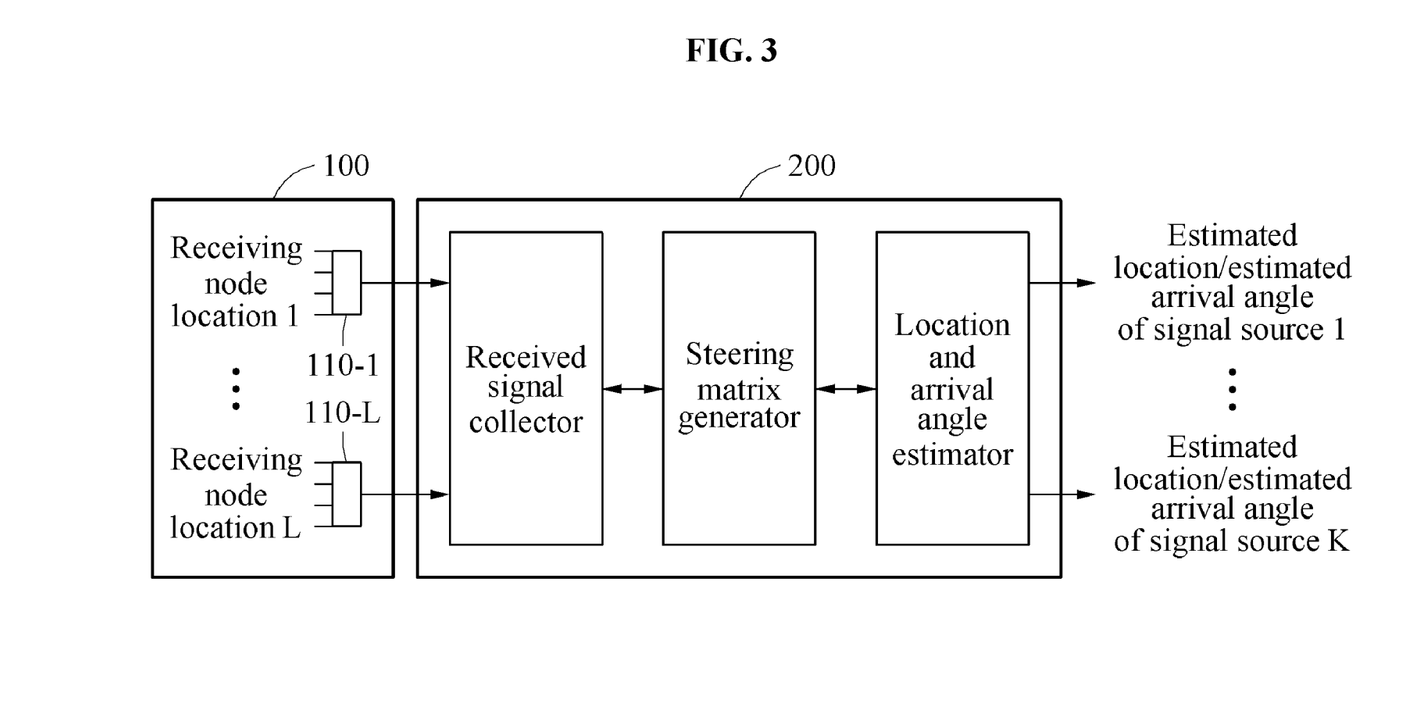
FIG. 3 is a block diagram illustrating an antenna and a processor of FIG. 1.

FIG. 2 is a diagram illustrating angles of arrival based on reception points and FIG. 3 is a block diagram illustrating the antenna and the processor of FIG. 1.

Referring to FIGS. 2 and 3, the processor 200 may estimate a location and an angle of arrival of a signal source using a signal received through the receiver 100. The receiver 100 may include a plurality of antennas 110-1 through 110-L. The processor 200 may estimate the angle of arrival of the signal source at a receiving point using a difference in phase (or phase and intensity) between received signals of the antennas 110-1 through 110-L included in the receiver 100.

The processor 200 may estimate the angle of arrival of the signal source at a plurality of points, and then estimate a location of the signal source using the estimated angle of arrival and location information of the points. The processor 200 may also directly estimate a location of the signal using a signal received from each signal source at a plurality of points at which the location is known. Using the estimated location of the signal source, an angle of arrival at each signal-source reception point may be estimated.

The processor 200 may perform two-dimensional (2D) location estimation of the signal source and an azimuth arrival angle estimation using an antenna array. Although the azimuth arrival angle estimation and the 2D location estimation are described in the following example, the processor 200 may also perform azimuth and elevation arrival angle estimation and three-dimensional (3D) location estimation using a general antenna array.

The processor 200 may estimate an angle of arrival using various algorithms. For example, the processor 200 may estimate an angle of arrival using a multiple signals classification (MUSIC) algorithm. Hereinafter, although an operation of arrival angle estimation is described based on the MUSIC algorithm as an example, the processor 200 may also apply another arrival angle estimation algorithm.

The processor 200 may estimate a location and an angle of arrival of the signal source based on a signal received from a receiving node. When performing the arrival angle estimation and the location estimation of the signal source at a plurality of points, the processor 200 may generate a virtual antenna array having an increased number of antenna array elements constituting the receiver 100 from the received signals received at the plurality of points so as to increase a resolution.

To virtually increase the number of antennas 110, for example, antennas in the antenna array, the processor 200 may generate a virtual antenna array having the increased number of antennas and a new direction vector and a steering matrix corresponding to the virtual antenna array by vectorizing received signals of a plurality of receiving points based on the location of the signal source.

Through this, the signal-source location estimating apparatus 10 may estimate a location of the signal source using a fixed signal-source location irrespective of a change of the receiving point.

The processor 200 may generate a new direction vector and a steering matrix by reflecting a change in phase and/or intensity of the received signal due to the difference between the distances from the signal source and the receiving points, and estimate a location of the signal source. The antenna 110 including the antenna array may include a single device or a plurality of independent devices. For example, the single device included in the antenna 110 may receive a signal from the signal source while moving. Also, the independent devices may be provided in different locations to receive a signal from the signal source.

The antenna 110 may be wired or wirelessly connected to the processor 200. The processor 200 may or may not have a function of estimating an angle of arrival itself.

Hereinafter, an operation of the processor 200 vectorizing a received signal and extracting a steering matrix will be described.

Although the following description is based on two signal sources and three receiving points as an example, the processor 200 may also extract a steering matrix for one or more signal sources and one or more receiving points in a likewise manner.

A signal $y_{L_k}$ received by each of the antennas 110 of the receiver 100 may be expressed as shown in Equation 1.

$$y_{L_1}(t) = [a_{L_1 s_1}(\theta_{L_1 s_1}) a_{L_1 s_2}(\theta_{L_1 s_2})] \begin{bmatrix} s_1(t) \\ s_2(t) \end{bmatrix} + n_{L_1}(t) \quad \text{[Equation 1]}$$

$$y_{L_2}(t) = [a_{L_2 s_1}(\theta_{L_2 s_1}) a_{L_2 s_2}(\theta_{L_2 s_2})] \begin{bmatrix} s_1(t) \\ s_2(t) \end{bmatrix} + n_{L_2}(t)$$

$$y_{L_3}(t) = [a_{L_3 s_1}(\theta_{L_3 s_1}) a_{L_3 s_2}(\theta_{L_3 s_2})] \begin{bmatrix} s_1(t) \\ s_2(t) \end{bmatrix} + n_{L_3}(t)$$

In Equation 1, $n_{L_k}$ denotes additive white gaussian noise (AWGN) at a receiving point, $\theta_{L_1 s_k}$ denotes an angle of arrival at which a $k^{th}$ signal source arrives at a receiving point $L_1$. $s_1(t)$ and $s_2(t)$ denote signals transmitted from the signal source.

$a_{L_1 s_k}(p_{s_k})$ denotes a direction vector corresponding to the angle of arrival $\theta_{L_1 s_k}$ at which the $k^{th}$ signal source arrives at the receiving point $L_1$. $p_{s_k}$ denotes a location of the $k^{th}$ signal source to be estimated and may satisfy $a_{L_1 s_k}(p_{s_k}) = a_{L_1 s_k}(\theta_{L_1 s_k})$.

The processor 200 may vectorize the received signal. The processor 200 may generate a virtual antenna array by vectorizing the received signal. When the processor 200 vectorizes the received signal, it may be treated as if the number of receivers 100 is increased by the virtual antenna array. The processor 200 may vectorize the received signal according to Equations 2 and 3.

$$y_{agg}(t) = A_{agg} s(t) + n_{agg}(t) \quad \text{[Equation 2]}$$

$$\underbrace{\begin{bmatrix} y_{L_1}(t) \\ y_{L_2}(t) \\ y_{L_3}(t) \end{bmatrix}}_{y_{agg}(t)} = \underbrace{\begin{bmatrix} h_{L_1 s_1} a_{L_1 s_1}(p_{s_1}) & h_{L_1 s_2} a_{L_1 s_2}(p_{s_2}) \\ h_{L_2 s_1} a_{L_2 s_1}(p_{s_1}) & h_{L_2 s_2} a_{L_2 s_2}(p_{s_2}) \\ h_{L_3 s_1} a_{L_3 s_1}(p_{s_1}) & h_{L_3 s_2} a_{L_3 s_2}(p_{s_2}) \end{bmatrix}}_{A_{agg}} \underbrace{\begin{bmatrix} s_1(t) \\ s_2(t) \end{bmatrix}}_{s(t)} + \underbrace{\begin{bmatrix} n_{L_1}(t) \\ n_{L_2}(t) \\ n_{L_3}(t) \end{bmatrix}}_{n_{agg}(t)} \quad \text{[Equation 3]}$$

In Equation 3, $h_{L_1 s_k}$ denotes a coefficient generated due to another factor including a distance between each signal source and each receiving point. The coefficient may indicate a difference in phase and intensity of the same transmitted signal received at different receiving points.

As described above, through the vectorization, the processor 200 may generate a virtual antenna array structure including ML antennas, ML being the product of M corresponding to the number of antennas 110 and L corresponding to the number of receiving points.

When the number of signal sources is K, the processor 200 may generate an ML×K steering matrix $A_{agg}$ including new directional vectors shown in Equation 4. A vector $a_{agg}(p_{s_k})$ included in $A_{agg}$ may be expressed as shown in Equation 4.

$$a_{agg}(p_{s_k}) = \begin{bmatrix} h_{L_1 s_k} a_{L_1 s_k}(p_{s_k}) \\ h_{L_2 s_k} a_{L_2 s_k}(p_{s_k}) \\ h_{L_3 s_k} a_{L_3 s_k}(p_{s_k}) \end{bmatrix} \quad \text{[Equation 4]}$$

In a new generated steering matrix, $a_{L_1 s_k}(p_{s_k}) = a_{L_1 s_k}(\theta_{L_1 s_k})$ is satisfied and $\theta_{L_1 s_k}$ is expressed using a function of locations of a signal source and a receiving node. In a case of 2D location estimation, the function of the locations of the signal source and the receiving node may be expressed by Equations 5 and 6.

$$\theta_{L_l s_k} = f(p_{s_k}, p_{L_l}) \quad \text{[Equation 5]}$$

$$\cos \theta_{L_l s_k} = \frac{x_{s_k} - x_{L_l}}{\sqrt{(x_{s_k} - x_{L_l})^2 + (y_{s_k} - y_{L_l})^2}} \quad \text{[Equation 6]}$$

The 3D location estimation may also be performed in the same manner as the 2D location estimation.

Hereinafter, a process in which the processor 200 calculates $h_{L_1 s_k}$ that is a coefficient generated due to another factor including a distance between each signal source and each receiving point will be described.

The processor 200 may calculate $h_{L_1 s_k}$ using at least two methods.

In one method, location information of a receiving point and an electromagnetic-wave propagation model may be used to calculate $h_{L_1 s_k}$. Specifically, the processor 200 may calculate distances between the receiving point and candidate locations of a signal source, and then determine $h_{L_1 s_k}$ using the electromagnetic-wave propagation model.

The processor 200 may determine $h_{L_1 s_k}$ using a function $h_{L_1 s_k} = f(p_{s_k}, p_{L_1})$ of the locations of the signal source and the receiving point, similarly to the directional vector determined using $a_{L_1 x_k}(p_{x_k}) = a_{L_1 x_k}(\theta_{L_1 s_k})$.

The processor 200 may calculate a distance $d_{L_1 s_k}$ between $s_k$ and a receiving point $L_1$ using $p_{s_k}, p_{L_1}$. Thereafter, the processor 200 may calculate a magnitude of the coefficient $h_{L_1 s_k}$ using a pathloss model and calculate a phase of $h_{L_1 s_k}$ using $\exp(-j2\pi f_c \tau_{L_1 s_k})$ in which $f_c$ denotes a carrier frequency of the signal source, $\tau_{L_1 s_k} = d_{L_1 s_k}/c$ denotes a propagation time of a signal, and c denotes a propagation speed of the signal.

In another method, a coefficient may be calculated through a transmission of a reference signal such as a pilot. The processor 200 may use the antenna 110 to periodically or aperiodically receive constant signals known by receivers at receiving points of signals transmitted from signal sources in an orthogonal or non-orthogonal methods so as to calculate values of $h_{L_1 s_k}$ corresponding to the receiving points.

When a difference between distances from the signal source to the receiving points is large, the processor 200 may align a transmission signal. When the difference between the distances from the signal source to the receiving points is significantly large so that a value of a propagation delay $\tau_{L_1 s_k}$ of a signal between links differs greatly, signals received at a time t at the receiving points may be different.

As such, when a difference between values $|d_{L_1 s_1} - d_{L_2 s_1}|$ corresponding to the distances between the receiving points and the signal source is significantly large, a value $|\tau_{L_1 s_1} - \tau_{L_2 s_1}|$ may also be correspondingly large. In this instance, received signals received at the time t at the receiving points $L_1$ and $L_2$ may be expressed as shown in Equation 7.

$$y_{L_1}(t) = [h_{L_1 s_1} a_{L_1 s_1}(p_{s_1}) h_{L_1 s_2} a_{L_1 s_2}(p_{s_2})] \begin{bmatrix} s_1(t - \tau_{L_1 s_1}) \\ s_2(t - \tau_{L_1 s_2}) \end{bmatrix} + n_{L_1}$$

$$y_{L_2}(t) = [h_{L_2 s_1} a_{L_2 s_1}(p_{s_1}) h_{L_2 s_2} a_{L_2 s_2}(p_{s_2})] \begin{bmatrix} s_1(t - \tau_{L_2 s_1}) \\ s_2(t - \tau_{L_2 s_2}) \end{bmatrix} + n_{L_2}$$

[Equation 7]

In this case, it may be difficult to perform approximation according to $s_1(t - \tau_{L_1 s_1}) \approx s_1(t - \tau_{L_1 s_2})$. For example, $s_1(t - \tau_{L_1 s_1}) \neq s_1(t - \tau_{L_1 s_2})$. In this instance, the processor 200 may vectorize the received signal using location information of a receiving node and a memory such that the transmission signal is aligned based on $s_1(t+\delta)$. That is, the processor 200 may vectorize the transmission signal by time shift of the transmission signal. Accordingly, the signal received by the antenna 110 may be vectorized as shown in Equation 8.

$$y_{agg}(t) = \begin{bmatrix} y_{L_1}(t - \tau_{L_1 s_1}) \\ y_{L_2}(t - \tau_{L_2 s_1}) \\ y_{L_3}(t - \tau_{L_3 s_1}) \end{bmatrix}$$

[Equation 8]

Hereinafter, an operation of the signal-source location estimating apparatus 10 estimating a location will be described in detail with reference to FIG. 4.

Figure 4:
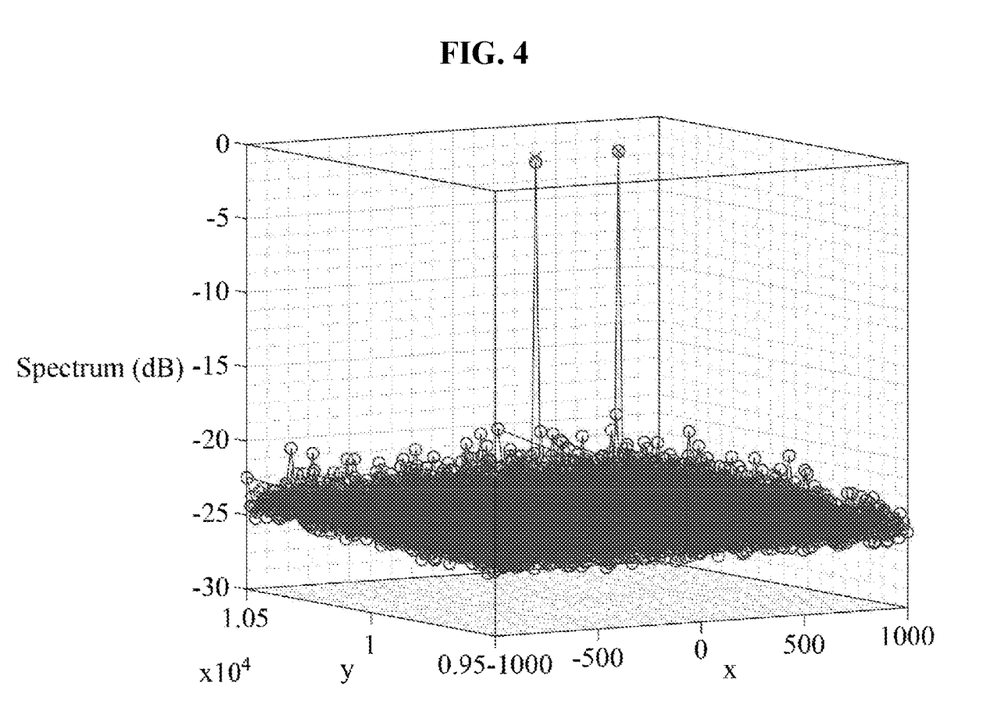
FIG. 4 is a diagram illustrating a spatial power spectrum for the signal-source location estimating apparatus of FIG. 1 to estimate a location of a signal source.

FIG. 4 is a diagram illustrating a spatial power spectrum for the signal-source location estimating apparatus of FIG. 1 to estimate a location of a signal source.

Referring to FIG. 4, the signal-source location estimating apparatus 10 may perform 3D location estimation as well as 2D location estimation. Although a location estimation operation to be described later is explained based on the 2D location estimation, the 3D location estimation can also be performed in a likewise manner.

The processor 200 may estimate a location of a signal source using various methods based on a vectorized received signal. For example, the processor 200 may estimate a location of the signal source using a nonlinear method such as a nonlinear least squares algorithm and a maximum likelihood algorithm and a linear method such as a linear least squares algorithm and a weighted linear least squares algorithm.

Also, the processor 200 may estimate a location of the signal source directly without estimating an angle of arrival. The processor 200 may obtain a noise subspace of a covariance matrix of a received signal for each receiving point based on a MUSIC algorithm, and then estimate a location of the signal source.

The signal-source location estimating apparatus 10 may estimate an angle of arrival using the MUSIC algorithm and estimate a location of the signal source based on the estimated angle of arrival. Although a location estimation method using the MUSIC algorithm is explained in the following description, a location estimation method using various schemes may be applicable.

The processor 200 may calculate a covariance matrix from T time samples of a vectorized received signal $y_{agg}(t)$ as shown in Equation 9.

$$R_{y_{agg}} = \frac{1}{T} \sum_{t=1}^{T} y_{agg}(t) y_{agg}^H(t)$$

[Equation 9]

The processor 200 may extract an eigenvalue and an eigenvector based on the covariance matrix. The processor 200 may eigen-decompose the covariance matrix using Equation 10, thereby extracting an eigenvalue as shown in Equation 11.

$$R_{agg} = U_{agg} \Lambda_{agg} U_{agg}^H$$

[Equation 10]

$$\Lambda_{agg} = \text{diag}[\lambda_1 \lambda_2 \ldots \lambda_{ML}]$$

[Equation 11]

In this instance, $\lambda_1 \geq \ldots \geq \lambda_{ML}$ is satisfied. Also, an eigenvector $U_{agg}$ may be expressed as shown in Equation 12.

$$U_{agg} = [U_{agg,s} U_{agg,n}]$$

[Equation 12]

The processor 200 may discriminate between eigenvectors $U_{agg,s}$ corresponding to K eigenvalues from a first position to a $K^{th}$ position in a descending order which span a transmission signal region and eigenvectors $U_{agg,n}$ corresponding to ML-K small values which span an AWGN region, based on the eigenvector and the eigenvalue.

The processor 200 may calculate a spatial power spectrum of the MUSIC algorithm defined by Equation 13 using a characteristic that columns of $U_{agg,s}$ are orthogonal to columns of $U_{agg,n}$.

$$P_{MUSIC}^{Agg}(p_{s_k}) = \frac{1}{\|a_{agg}^H(p_{s_k})U_{agg,n}\|^2} \quad \text{[Equation 13]}$$

The processor 200 may estimate a location of the signal source using Equation 13. That is, the processor 200 may estimate a location of the signal source based on a steering matrix and an eigenvector. Specifically, the processor 200 may estimate $p_{s_1} \ldots p_{s_k}$ corresponding to K peak points in the spatial power spectrum, as locations of K signal sources.

After estimating the location of the signal source, the processor 200 may estimate angles of arrival between the signal source and receiving points $L_1=[x_{L_1},y_{L_1}], L_2=[x_{L_2},y_{L_2}], L_3=[x_{L_3},y_{L_3}]$ using location information of the receiving points.

When estimating the location of the signal source and the angle of arrival as described above, a resolution of estimation may significantly increase. In the example of FIG. 4, if L=10, a spatial power spectrum of two signals sources may be expressed.

An X-mark may indicate an actual location of the signal source. In this instance, M=5, T=200, and SNR(Signal to Noise Ratio)=8 dB may be considered. An actual angle of arrival may be represented in Table 1. In Table 1, the angle of arrival may be represented in units of degree.

TABLE 1

|    | L1       | L2       | L3       | L4       | L5       | L6       | L7       | L8       | L9       | L10      |
|----|----------|----------|----------|----------|----------|----------|----------|----------|----------|----------|
| s1 | 64.35899 | 66.7323  | 69.19321 | 71.73711 | 74.35775 | 77.04724 | 79.79603 | 82.59309 | 85.42608 | 88.28164 |
| s2 | 62.52557 | 64.82648 | 67.21759 | 69.69553 | 72.25533 | 74.89042 | 77.59258 | 80.35195 | 83.15723 | 85.99583 |

As shown in Table 1, in the signal-source location estimating apparatus 10, a difference in angle of arrival of two signal sources may be small, and a resolution of location estimation may be remarkably increased even for small M, T, SNR values.

As such, the signal-source location estimating apparatus 10 may accurately estimate a location even with a small number of time samples and thus, may be easily applied to a location estimation of a moving object.

Figure 5:
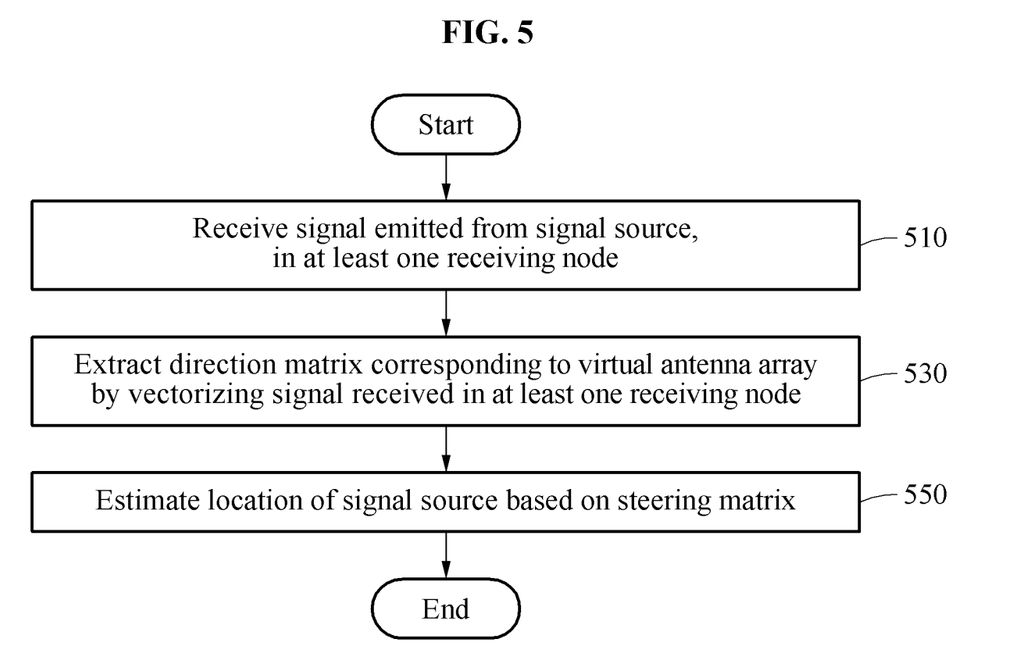
FIG. 5 is a flowchart illustrating an operation of the signal-source location estimating apparatus of FIG. 1.

FIG. 5 is a flowchart illustrating operations of the signal-source location estimating apparatus of FIG. 1.

Referring to FIG. 5, in operation 510, the receiver 100 may receive a signal emitted from a signal source, in at least one receiving node.

In operation 530, the processor 200 may extract a steering matrix corresponding to a virtual antenna array by vectorizing the signal received in the at least one receiving node. The processor 200 may calculate a coefficient included in the steering matrix based on information on a reception location in which the signal is received by the at least one receiving node and an electromagnetic-wave propagation model, and extract the steering matrix based on the coefficient.

Specifically, the processor 200 may calculate distances between the reception location and candidate locations of the signal source. The processor 200 may calculate a magnitude of the coefficient using the distances and the electromagnetic-wave propagation model, and calculate a phase of the coefficient.

The processor 200 may calculate a magnitude of the coefficient using a pathloss model based on the distances, and calculate the phase based on a carrier frequency of the signal source, a propagation time of the signal, and a propagation speed of the signal.

Also, the processor 200 may calculate a coefficient included in the steering matrix based on a reference signal received from the signal source. Specifically, the processor 200 may calculate the coefficient by periodically or aperiodically receiving a constant signal corresponding to the reception location based on an orthogonal or non-orthogonal method.

In operation 550, the processor 200 may estimate a location of the signal source based on the steering matrix. Specifically, the processor 200 may calculate a covariance matrix from a time sample of the vectorized signal and extract an eigenvalue and an eigenvector from the covariance matrix. The processor 200 may estimate a location of the signal source based on the eigenvector and the steering matrix. The processor 200 may estimate a point corresponding to a peak value of a spatial power spectrum based on the steering matrix and the eigenvector, as a location of the signal source.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of estimating a location of a signal source, the method comprising:
   receiving, in at least one receiving node, a signal emitted from a signal source;
   extracting a steering matrix corresponding to a virtual antenna array by vectorizing the signal received in the at least one receiving node; and
   estimating a location of the signal source based on the steering matrix,
   wherein the extracting the steering matrix comprises extracting the steering matrix based on a location of the signal source to be estimated,
   wherein the extracting the steering matrix comprises:
      generating a first direction vector based on a first location of a first receiving node among the receiving node,
      generating a second direction vector based on a second location of a second receiving node among the receiving node, and
      extracting the steering matrix based on the first direction vector and the second direction vector.

2. The method of claim 1, wherein the extracting comprises:
   calculating a coefficient included in the steering matrix based on information on a reception location in which the signal is received by the at least one receiving node and an electromagnetic-wave propagation model; and
   extracting the steering matrix based on the coefficient.

3. The method of claim 2, wherein the calculating comprises:
   calculating a distance between the reception location and each of candidate locations of the signal source;
   calculating a phase of the coefficient; and
   calculating a magnitude of the coefficient using the distance and the electromagnetic-wave propagation model.

4. The method of claim 3, wherein the calculating of the phase comprises:
   calculating the phase based on a carrier frequency of the signal source, a propagation time of the signal, and a propagation speed of the signal.

5. The method of claim 3, wherein the calculating of the magnitude comprises:
   calculating a magnitude of the coefficient using a pathloss model based on the distance.

6. The method of claim 1, wherein the extracting comprises:
   calculating a coefficient included in the steering matrix based on a reference signal received from the signal source; and
   extracting the steering matrix based on the coefficient.

7. The method of claim 6, wherein the calculating of the coefficient comprises:
   calculating the coefficient by periodically or aperiodically receiving a constant signal corresponding to the reception location based on an orthogonal or non-orthogonal method.

8. The method of claim 1, wherein the extracting comprises:
   vectorizing the signal by time shift of the signal when a difference between distances from the signal source to the at least one receiving node is greater than or equal to a predetermined value.

9. The method of claim 1, wherein the estimating comprises:
   calculating a covariance matrix from a time sample of the vectorized signal;
   extracting an eigenvalue and an eigenvector from the covariance matrix; and
   estimating a location of the signal source based on the eigenvector and the steering matrix.

10. The method of claim 9, wherein the estimating of the location of the signal source based on the eigenvector comprises:
    estimating, as a location of the signal source, a point corresponding to a peak value of a spatial power spectrum based on the steering matrix and the eigenvector.

11. An apparatus for estimating a location of a signal source, the apparatus comprising:
    a receiver configured to receive, in at least one receiving node, a signal emitted from a signal source; and
    a processor configured to extract a steering matrix corresponding to a virtual antenna array by vectorizing the signal received in the at least one receiving node and estimate a location of the signal source based on the steering matrix,
    wherein the processor further configured to:
    extract the steering matrix based on a location of the signal source to be estimated,
    generate a first direction vector based on a first location of a first receiving node among the receiving node,
    generate a second direction vector based on a second location of a second receiving node among the receiving node, and
    extract the steering matrix based on the first direction vector and the second direction vector.

12. The apparatus of claim 11, wherein the processor is configured to calculate a coefficient included in the steering matrix based on information on a reception location in which the signal is received by the at least one receiving node and an electromagnetic-wave propagation model, and extract the steering matrix based on the coefficient.

13. The apparatus of claim 12, wherein the processor is configured to calculate a distance between the reception location and each of candidate locations of the signal source, calculate a phase of the coefficient, and calculate a magnitude of the coefficient using the distance and the electromagnetic-wave propagation model.

14. The apparatus of claim 13, wherein the processor is configured to calculate the phase based on a carrier frequency of the signal source, a propagation time of the signal, and a propagation speed of the signal.

15. The apparatus of claim 13, wherein the processor is configured to calculate a magnitude of the coefficient using a pathloss model based on the distance.

16. The apparatus of claim 11, wherein the processor is configured to calculate a coefficient included in the steering matrix based on a reference signal received from the signal source and extract the steering matrix based on the coefficient.

17. The apparatus of claim 16, wherein the processor is configured to calculate the coefficient by periodically or aperiodically receiving a constant signal corresponding to the reception location based on an orthogonal or non-orthogonal method.

18. The apparatus of claim 11, wherein the processor is configured to vectorize the signal by time shift of the signal when a difference between distances from the signal source to the at least one receiving node is greater than or equal to a predetermined value.

19. The apparatus of claim 17, wherein the processor is configured to calculate a covariance matrix from a time sample of the vectorized signal, extract an eigenvalue and an eigenvector from the covariance matrix, and estimate a location of the signal source based on the eigenvector and the steering matrix.

20. The apparatus of claim 19, wherein the processor is configured to estimate, as a location of the signal source, a point corresponding to a peak value of a spatial power spectrum based on the steering matrix and the eigenvector.

* * * * *